(12) United States Patent
Schmidt

(10) Patent No.: US 9,529,509 B1
(45) Date of Patent: Dec. 27, 2016

(54) ITEM SELECTION

(71) Applicant: Google Inc., Mountain View, CA (US)

(72) Inventor: Brian K. Schmidt, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 219 days.

(21) Appl. No.: 14/039,405

(22) Filed: Sep. 27, 2013

(51) Int. Cl.
G06F 3/048 (2013.01)
G06F 3/0484 (2013.01)
G06F 3/0485 (2013.01)

(52) U.S. Cl.
CPC ......... *G06F 3/04842* (2013.01); *G06F 3/0485* (2013.01)

(58) Field of Classification Search
None
See application file for complete search history.

(56) References Cited

U.S. PATENT DOCUMENTS

| 5,485,174 | A * | 1/1996 | Henshaw et al. | 345/684 |
|---|---|---|---|---|
| 7,600,192 | B1 * | 10/2009 | Hashimoto et al. | 715/802 |
| 7,895,533 | B2 | 2/2011 | Fagans | |
| 8,228,330 | B2 * | 7/2012 | Alsbury et al. | 345/440 |
| 8,237,666 | B2 | 8/2012 | Soo et al. | |
| 8,418,080 | B2 | 4/2013 | Sheldon et al. | |
| 2002/0033849 | A1 * | 3/2002 | Loppini et al. | 345/848 |
| 2003/0020733 | A1 * | 1/2003 | Yin | 345/660 |
| 2007/0033543 | A1 * | 2/2007 | Ngari et al. | 715/788 |
| 2008/0301735 | A1 * | 12/2008 | Chicles | 725/47 |
| 2010/0079498 | A1 * | 4/2010 | Zaman et al. | 345/661 |
| 2010/0085384 | A1 * | 4/2010 | Kim et al. | 345/660 |
| 2010/0214300 | A1 * | 8/2010 | Alsbury et al. | 345/440.2 |
| 2011/0138275 | A1 | 6/2011 | Yu | |
| 2011/0197156 | A1 * | 8/2011 | Strait et al. | 715/771 |
| 2013/0212534 | A1 | 8/2013 | Knight et al. | |

* cited by examiner

*Primary Examiner* — Jeffrey A Gaffin
*Assistant Examiner* — Nhat-Huy T Nguyen
(74) *Attorney, Agent, or Firm* — Patent Law Works LLP

(57) ABSTRACT

A method, computer readable medium and computing system for rendering an initial viewing field including a plurality of thumbnail images, wherein each of the plurality of thumbnail images is associated with a computer object. A portion selection input is received from a user identifying a portion of the initial viewing field, defining a selected portion of the initial viewing field. In response to the portion selection input, a spherical magnified viewing field of the selected portion of the initial viewing field is rendered. The spherical magnified viewing field includes one or more magnified thumbnail images that are magnified views of one or more of the plurality of thumbnail images included within the initial viewing field.

21 Claims, 6 Drawing Sheets

ITEM SELECTION

BACKGROUND

This disclosure relates to item selection and, more particularly, to item selection from amongst a large collection of items.

When using computing devices, the user is often required to select items (e.g., various data files, shortcuts, directory folders, application icons) from amongst a plurality of items (e.g., a directory/folder of items). For example, a selection of word processing documents may be stored within a word processing directory/folder; a selection of digital photograph files may be stored within a photograph directory/folder; a selection of digital clipart files may be stored within a clipart directory/folder, and a selection of program icons/shortcuts may be stored within a desktop directory/folder.

Unfortunately, when the computing device being used is compact in size (e.g., a handheld computing device, such as a smart phone), the size of the display screen included within such a compact computing device may be small in size, which may frustrate the process of the user selecting a specific item (e.g., a specific data file/program icon/shortcut) from a large collection of items (e.g., a directory/folder of items).

SUMMARY OF DISCLOSURE

In one implementation, a computer-implemented method includes rendering an initial viewing field including a plurality of thumbnail images, wherein each of the plurality of thumbnail images is associated with a computer object. A portion selection input is received from a user identifying a portion of the initial viewing field, defining a selected portion of the initial viewing field. In response to the portion selection input, a spherical magnified viewing field of the selected portion of the initial viewing field is rendered. The spherical magnified viewing field includes one or more magnified thumbnail images that are magnified views of one or more of the plurality of thumbnail images included within the initial viewing field.

One or more of the following features may be included. The initial viewing field may be a spherical viewing field. The user may be enabled to vary a magnification level associated with the spherical magnified viewing field. A thumbnail selection input may be received from the user identifying a selected magnified thumbnail image chosen from the one or more magnified thumbnail images included within the spherical magnified viewing field. In response to the thumbnail selection input, a specific computer object associated with the selected magnified thumbnail image may be processed. A scrolling input may be received from the user, wherein the scrolling input identifies a scroll direction.

The scrolling input may concern a requested movement in the scroll direction of the one or more magnified thumbnail images included within the spherical magnified viewing field. The spherical magnified viewing field may be modified in response to the scrolling input. The initial viewing field may be updated in response to the modification of the spherical magnified viewing field.

The scrolling input may concern a requested movement in the scroll direction of the one or more thumbnail images included within the initial viewing field. The initial viewing field may be modified in response to the scrolling input. The spherical magnified viewing field may be updated in response to the modification of the initial viewing field.

In another implementation, a computer program product resides on a computer readable medium that has a plurality of instructions stored on it. When executed by a processor, the instructions cause the processor to perform operations including rendering an initial viewing field including a plurality of thumbnail images, wherein each of the plurality of thumbnail images is associated with a computer object. A portion selection input is received from a user identifying a portion of the initial viewing field, defining a selected portion of the initial viewing field. In response to the portion selection input, a spherical magnified viewing field of the selected portion of the initial viewing field is rendered. The spherical magnified viewing field includes one or more magnified thumbnail images that are magnified views of one or more of the plurality of thumbnail images included within the initial viewing field.

One or more of the following features may be included. The initial viewing field may be a spherical viewing field. The user may be enabled to vary a magnification level associated with the spherical magnified viewing field. A thumbnail selection input may be received from the user identifying a selected magnified thumbnail image chosen from the one or more magnified thumbnail images included within the spherical magnified viewing field. In response to the thumbnail selection input, a specific computer object associated with the selected magnified thumbnail image may be processed. A scrolling input may be received from the user, wherein the scrolling input identifies a scroll direction.

The scrolling input may concern a requested movement in the scroll direction of the one or more magnified thumbnail images included within the spherical magnified viewing field. The spherical magnified viewing field may be modified in response to the scrolling input. The initial viewing field may be updated in response to the modification of the spherical magnified viewing field.

The scrolling input may concern a requested movement in the scroll direction of the one or more thumbnail images included within the initial viewing field. The initial viewing field may be modified in response to the scrolling input. The spherical magnified viewing field may be updated in response to the modification of the initial viewing field.

In another implementation, a computing system includes at least one processor and at least one memory architecture coupled with the at least one processor, wherein the computing system is configured to perform operations including rendering an initial viewing field including a plurality of thumbnail images, wherein each of the plurality of thumbnail images is associated with a computer object. A portion selection input is received from a user identifying a portion of the initial viewing field, defining a selected portion of the initial viewing field. In response to the portion selection input, a spherical magnified viewing field of the selected portion of the initial viewing field is rendered. The spherical magnified viewing field includes one or more magnified thumbnail images that are magnified views of one or more of the plurality of thumbnail images included within the initial viewing field.

One or more of the following features may be included. The initial viewing field may be a spherical viewing field. The user may be enabled to vary a magnification level associated with the spherical magnified viewing field. A thumbnail selection input may be received from the user identifying a selected magnified thumbnail image chosen from the one or more magnified thumbnail images included within the spherical magnified viewing field. In response to the thumbnail selection input, a specific computer object associated with the selected magnified thumbnail image may be processed. A scrolling input may be received from the user, wherein the scrolling input identifies a scroll direction.

The scrolling input may concern a requested movement in the scroll direction of the one or more magnified thumbnail images included within the spherical magnified viewing field. The spherical magnified viewing field may be modified in response to the scrolling input. The initial viewing field may be updated in response to the modification of the spherical magnified viewing field.

The scrolling input may concern a requested movement in the scroll direction of the one or more thumbnail images included within the initial viewing field. The initial viewing field may be modified in response to the scrolling input. The spherical magnified viewing field may be updated in response to the modification of the initial viewing field.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE DISCLOSURE

Figure 1:
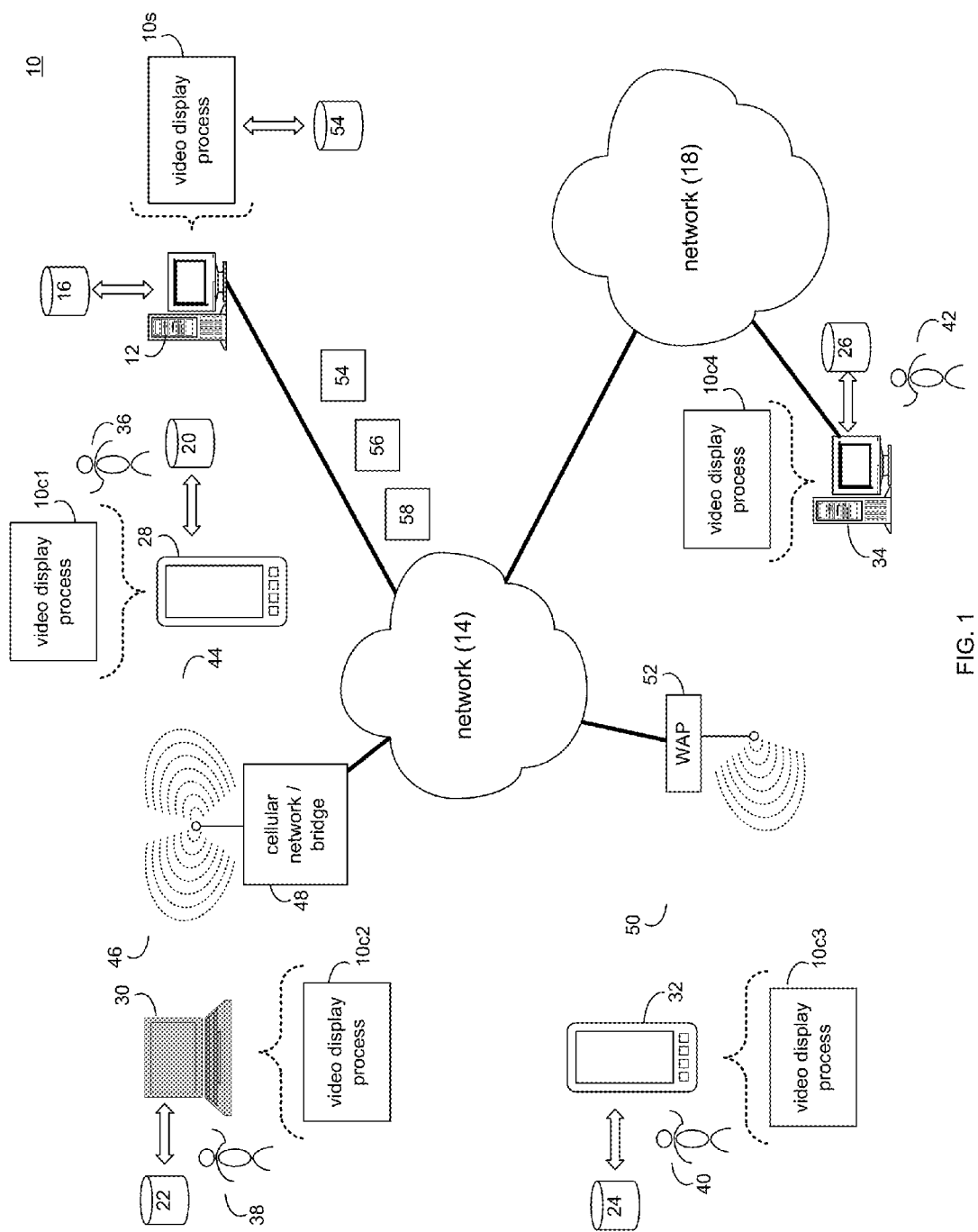
FIG. 1 is a diagrammatic view of a distributed computing network including a computing device that executes an item selection process according to an implementation of the present disclosure.
Figure 2:
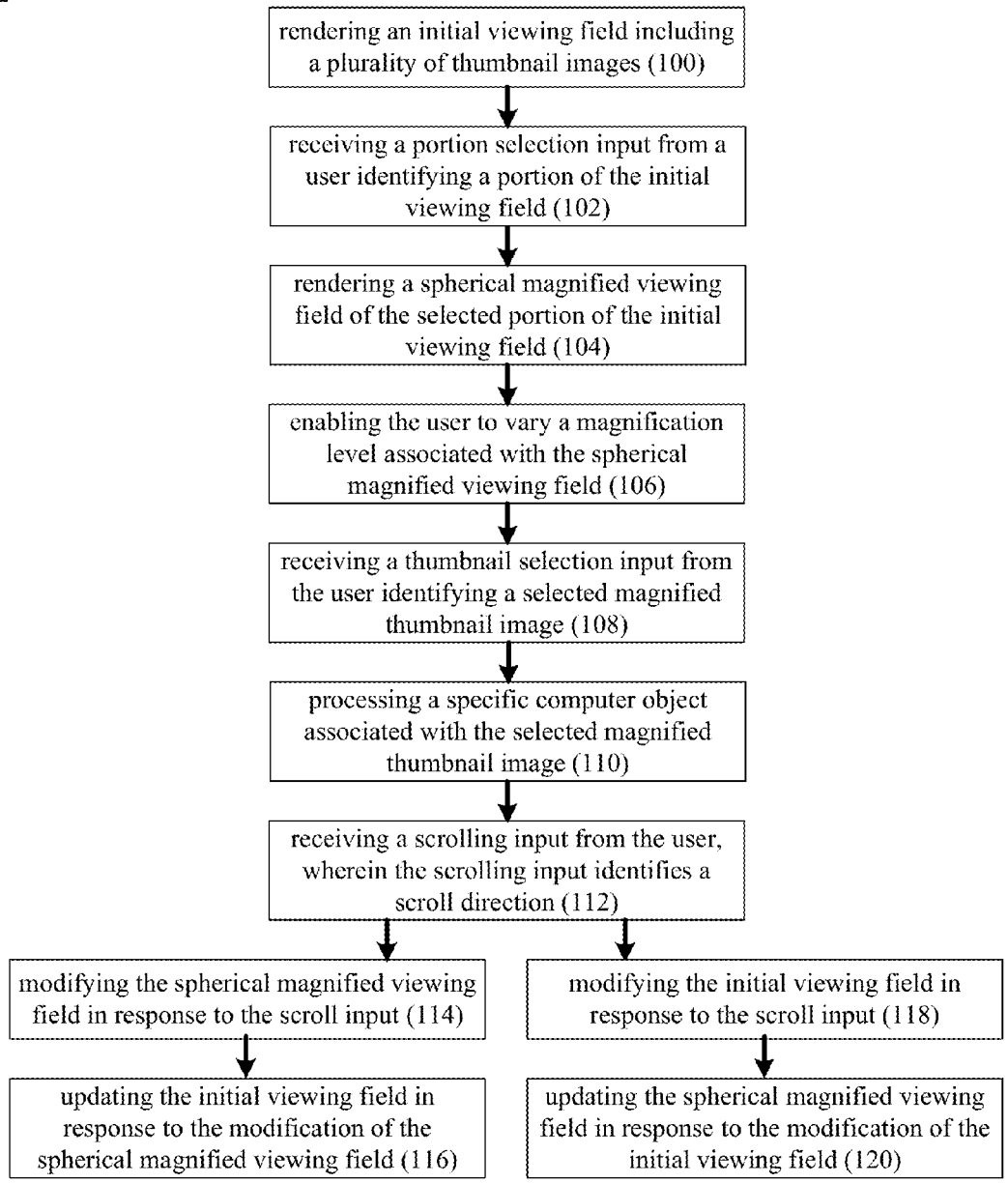
FIG. 2 is a flowchart of the item selection process of FIG. 1 according to an implementation of the present disclosure.

In FIGS. 1 & 2, there is shown item selection process 10. Item selection process 10 may be implemented as a server-side process, a client-side process, or a hybrid server-side/client-side process. For example, item selection process 10 may be implemented as a purely server-side process via item selection process 10s. Alternatively, item selection process 10 may be implemented as a purely client-side process via one or more of item selection process 10c1, item selection process 10c2, item selection process 10c3, and item selection process 10c4. Alternatively still, item selection process 10 may be implemented as a hybrid server-side/client-side process via item selection process 10s in combination with one or more of item selection process 10c1, item selection process 10c2, item selection process 10c3, and item selection process 10c4. Accordingly, item selection process 10 as used in this disclosure may include any combination of item selection process 10s, item selection process 10c1, item selection process 10c2, item selection process 10c3, and item selection process 10c4.

As will be discussed below in greater detail, item selection process 10 may render 100 an initial viewing field including a plurality of thumbnail images. Each of the plurality of thumbnail images may be associated with a computer object file. Item selection process 10 may receive 102 a portion selection input from a user identifying a portion of the initial viewing field, thus defining a selected portion of the initial viewing field. In response to the portion selection input, item selection process 10 may render 104 a spherical magnified viewing field of the selected portion of the initial viewing field. The spherical magnified viewing field may include one or more magnified thumbnail images that are magnified views of one or more of the plurality of thumbnail images included within the initial viewing field.

Item selection process 10s may be a server application and may reside on and may be executed by computing device 12, which may be connected to network 14 (e.g., the Internet or a local area network). Examples of computing device 12 may include, but are not limited to: a personal computer, a laptop computer, a personal digital assistant, a data-enabled cellular telephone, a notebook computer, a television with one or more processors embedded therein or coupled thereto, a server computer, a series of server computers, a mini computer, a mainframe computer, or a dedicated network device.

The instruction sets and subroutines of item selection process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of item selection processes 10c1, 10c2, 10c3, 10c4 may include but are not limited to a web browser, a web browser plug-in or applet, a game console user interface, a video conference user interface, or a specialized application. The instruction sets and subroutines of item selection processes 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, data-enabled, cellular telephone 28, laptop computer 30, personal digital assistant 32, personal computer 34, a notebook computer (not shown), a server computer (not shown), a gaming console (not shown), a television (not shown), a tablet computer (not shown) and a dedicated network device (not shown). Client electronic devices 28, 30, 32, 34 may each execute an operating system. Client electronic devices 28, 30, 32, 34 may be used by users 36, 38, 40, 42 respectively.

The various client electronic devices (e.g., client electronic devices 28, 30, 32, 34) may be directly or indirectly coupled to network 14 (or network 18). For example, data-enabled, cellular telephone 28 and laptop computer 30 are shown wirelessly coupled to network 14 via wireless communication channels 44, 46 (respectively) established between data-enabled, cellular telephone 28, laptop computer 30 (respectively) and cellular network/bridge 48, which is shown directly coupled to network 14. Further, personal digital assistant 32 is shown wirelessly coupled to network 14 via wireless communication channel 50 established between personal digital assistant 32 and wireless access point (i.e., WAP) 52, which is shown directly coupled to network 14. Additionally, personal computer 34 is shown directly coupled to network 18 via a hardwired network connection.

WAP 52 may be, for example, an IEEE 802.11a, 802.11b, 802.11g, 802.11n, Wi-Fi, and/or Bluetooth device that is capable of establishing wireless communication channel 50 between personal digital assistant 32 and WAP 52. As is known in the art, IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Generally, item selection process 10 may be configured to provide users with an interface that allows for the browsing of large collections of items so that one (or more) items may be selected for use in application-specific operations. For example, the collection of items may be mapped onto a spherical surface. In some implementations, these items may be grouped/organized so that closely related items are positioned proximate each other (though this is not a requirement). When the collection of items is large, items may be represented using small visual depictions (e.g., thumbnails) with a low-level of detail so that the overall size of the sphere may be constrained to a manageable size. Accordingly and in this particular view, the user may be provided with a comparatively small amount of information for making a selection (e.g., typically just enough to obtain a sense of the type or general pattern of items in the vicinity). The sphere may be rendered (e.g., like a hollow, elastic shell; much like a spherical latex balloon) so that items appear on all sides of the sphere, wherein the user may manipulate their view of the sphere by scrolling to see hidden portions of the sphere.

The entire sphere may be expanded (thereby increasing the resolution of all of the items rendered on the surface of the sphere) or the entire sphere may be contracted (thereby reducing the resolution of all items rendered on the surface of the sphere). As will be discussed below, portions of the surface of the sphere may be expanded or distorted in a localized fashion, which may result in the magnification of certain items to a resolution sufficient to enable selection by the user (while nearby items may lose resolution gradually). Visually, this effect may be similar to passing a magnifying lens over the surface of the sphere or pushing outward on the surface of the sphere from within the sphere. For example, this magnification effect may be modeled to have the effect of a smaller, rigid cursor sphere placed within the interior of the item sphere, wherein a virtual force is applied outward so that the cursor is pushed outward, resulting in the other surface of the item sphere being stretched and distorted outward and the items proximate the cursor sphere being magnified. For example, item selection process 10 may be modeled as if gravitational or magnetic forces are applied to the inner cursor sphere, wherein varying the amount of gravitational/magnetic force applied to the cursor sphere may be used to vary the amount of magnification. Additionally/alternatively, item selection process 10 may be modeled as if the elasticity parameters of the item sphere may be varied to allow for an increase/decrease in magnification level. While the above-referenced implementations are meant to be illustrative, they are not intended to be all inclusive. Accordingly, other methods of implementing such physics-based models may be readily apparent and are considered to be within the scope of this disclosure.

Figure 3:
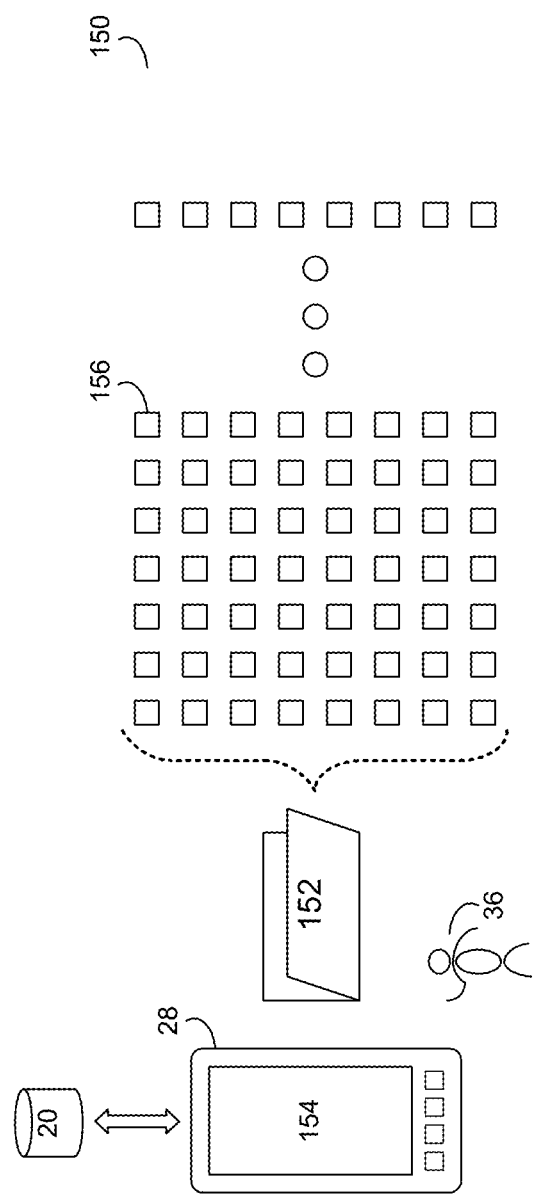
FIG. 3 is a diagrammatic view of a client electronic device of FIG. 1 according to an implementation of the present disclosure.

Referring also to FIG. 3, assume for illustrative purposes that data-enabled, cellular telephone 28 includes a camera (not shown) and that user 36 uses data-enabled, cellular telephone 28 to take photographs. Accordingly, data-enabled, cellular telephone 28 may store a plurality of data files (e.g., data files 150) within a folder (e.g., folder 152) of storage device 20, which is coupled to data-enabled, cellular telephone 28. Further assume that display screen 154 included within data-enabled, cellular telephone 28 is comparatively small in size. Item selection process 10 may be configured to render an interface that allows user 36 to view folder 152 (and the various data files 150 included within folder 152) in a manner that does not require excessive scrolling and/or repeated zooming/unzooming operations.

Figure 4:
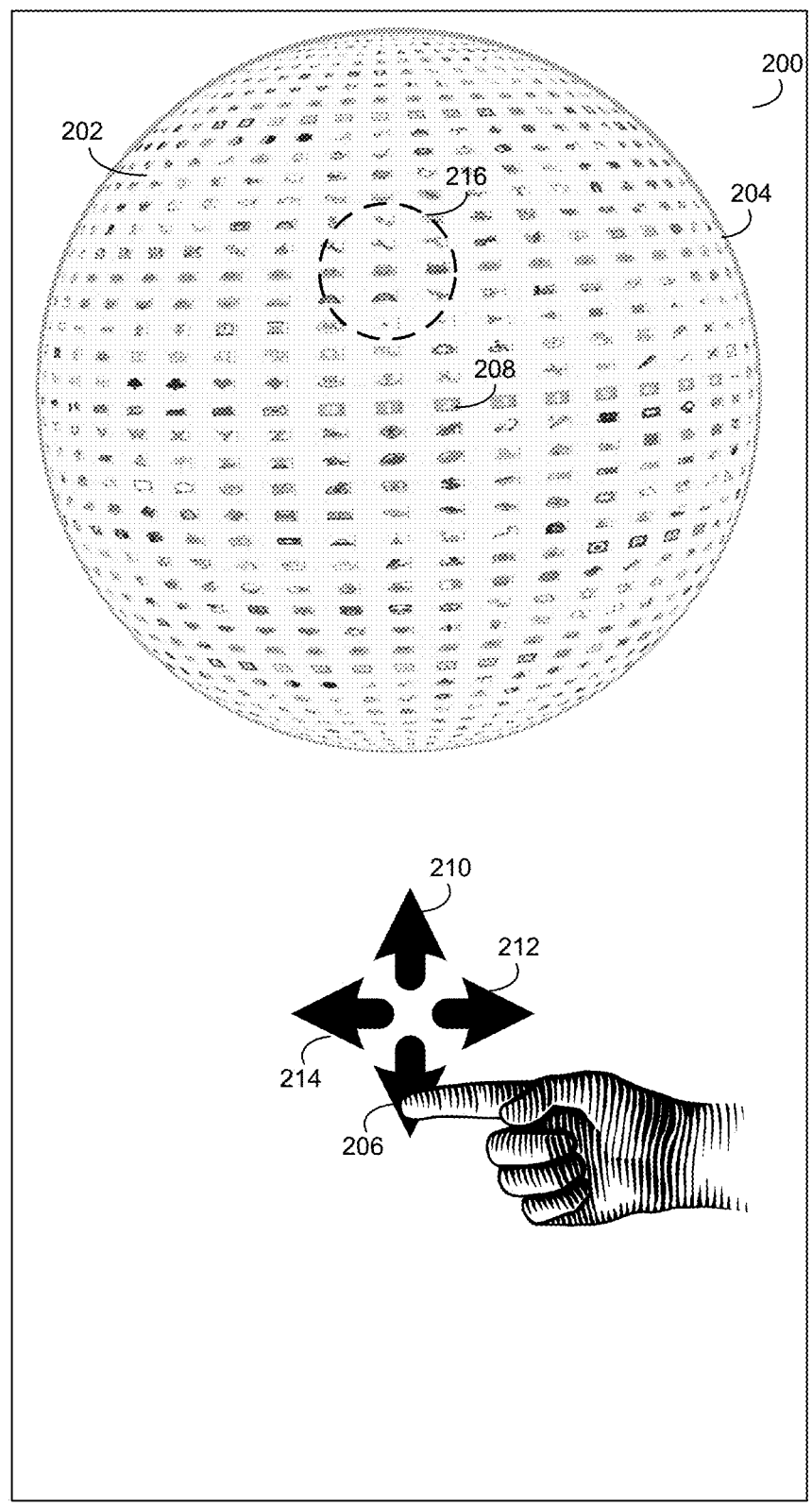
FIG. 4 is a diagrammatic view of an interface rendered by the item selection process of FIG. 1 according to an implementation of the present disclosure.

Referring also to FIG. 4, assume that user 36 chooses to review the contents of folder 152. Accordingly, item selection process 10 may render 100 initial viewing field 200 that may include a plurality of thumbnail images (e.g., thumbnail images 202). Each of the plurality of thumbnail images (e.g., thumbnail images 202) may be associated with a specific data file (e.g., data file 156). For example, since (in this example) the various data files 150 included within folder 152 are image files (e.g., digital photographs), thumbnail images 202 may be miniature graphical representations of these image files (namely data files 152).

While the following discussion concerns each of the plurality of thumbnail images (e.g., thumbnail images 202) being associated with specific data file (e.g., data file 156), this is for illustrative purposes only and is not intended to be a limitation of this disclosure, as other configurations are possible and are considered to be within the scope of this disclosure. For example, each of the plurality of thumbnail images (e.g., thumbnail images 202) may be associated with any computer object. Examples of such computer objects may include but are not limited to: a data file, an application icon (e.g., an icon associated with a computer application), a data folder (e.g., a folder/directory that may contain one or more computer objects), a shortcut (e.g., a link/pathway to e.g., an application, a data file or a folder), a computer-implemented action (e.g., the uploading of a group of local data files to a remote server), or a batch routine (e.g., an automated procedure that e.g., opens an application and addresses an email to a specific person).

Initial viewing field 200 may be rendered by item selection process 10 as a spherical viewing field. Specifically, initial viewing field 200 may render the contents of folder 152 in a spherical fashion, wherein thumbnail images 202 are shown to be positioned about the surface of a sphere (e.g. sphere 204). Accordingly, when reviewing thumbnail images 202 included within this "spherical" initial viewing field 200, user 36 (in this example) may provide input signals to item selection process 10 so that user 36 may manipulate sphere 204 to see the thumbnail images 202 rendered upon the various surfaces of sphere 204 (e.g. the upper surface, the lower surface, the left surface, the right surface, the front surface, and the back surface).

For example, assume for illustrative purposes that display screen 154 included within data-enabled, cellular telephone 28 is a touch-sensitive display screen. Accordingly, user 36 may manipulate initial viewing field 200 via one or more touch-based commands that are provided to item selection process 10. For example, in the event that user 36 swipes their finger on display screen 154 in a downward direction (e.g. the direction of arrow 206), item selection process 10 may rotate sphere 204 in a downward direction (e.g. so that thumbnail 208 moves in the direction of arrow 206). Further, if user 36 swipes their finger on display screen 154 in an upward direction (e.g. in the direction of arrow 210), item selection process 10 may rotate sphere 204 in an upward direction (e.g. so that thumbnail 208 moves in the direction of arrow 210). Additionally, if user 36 swipes their finger on display screen 154 in a rightward direction (e.g. in the direction of arrow 212), item selection process 10 may rotate sphere 204 in a rightward direction (e.g. so that thumbnail 208 moves in the direction of arrow 212). And, if user 36 swipes their finger on display screen 154 in a leftward direction (e.g. in the direction of arrow 214), item selection process 10 may rotate sphere 204 in a leftward direction (e.g. so that thumbnail 208 moves in the direction of arrow 214).

While display screen 154 is described above as being a touch-sensitive display screen that responds to "swipe" command issued by user 36, this is for illustrative purposes only and is not intended to be a limitation of this disclosure, as of the configurations are possible. For example, display screen 154 may not be a touch-sensitive display screen. Accordingly, in order for user 36 to manipulate initial viewing screen 200, user 36 may need to provide input to item selection process 10 using an input device (e.g. a mouse, a touchpad, a keyboard-based joystick, keyboard keys, or dedicated switches; not shown).

As the surface of sphere 204 is shown to include a large quantity of thumbnail images (e.g. thumbnail images 202), when sphere 204 is displayed on a compact display screen (e.g. such as display screen 154 included within data-enabled, cellular telephone 28), the ability of user 36 to see one or more of thumbnail images 202 with the requisite level of clarity may be compromised. Accordingly, item selection process 10 may be configured to allow user 36 to select a specific portion of sphere 204 so that an enhanced level of review may be performed by the user.

Assume for illustrative purposes that user 36 is looking for a specific photographic image from within the various data files 150 included within folder 152. Further, assume that user 36 believes that the specific desired photographic image that they are looking for is in a certain area (e.g., area 216) of sphere 204 but are unsure, as the size of the thumbnail images included within area 216 are too small to be seen clearly (due to the compact size of display screen 154).

Accordingly, user 36 may select area 216 so that the thumbnail images proximate area 216 may be reviewed in a magnified fashion. In the event that display screen 154 is a touch-sensitive display screen, user 36 may touch select area 216 of sphere 204. Alternatively and in the event that display screen 154 is not touch-sensitive, user 36 may select area 216 via an input device (e.g. a mouse, a touchpad, a keyboard-based joystick, keyboard keys, or dedicated switches; not shown).

Figure 5:
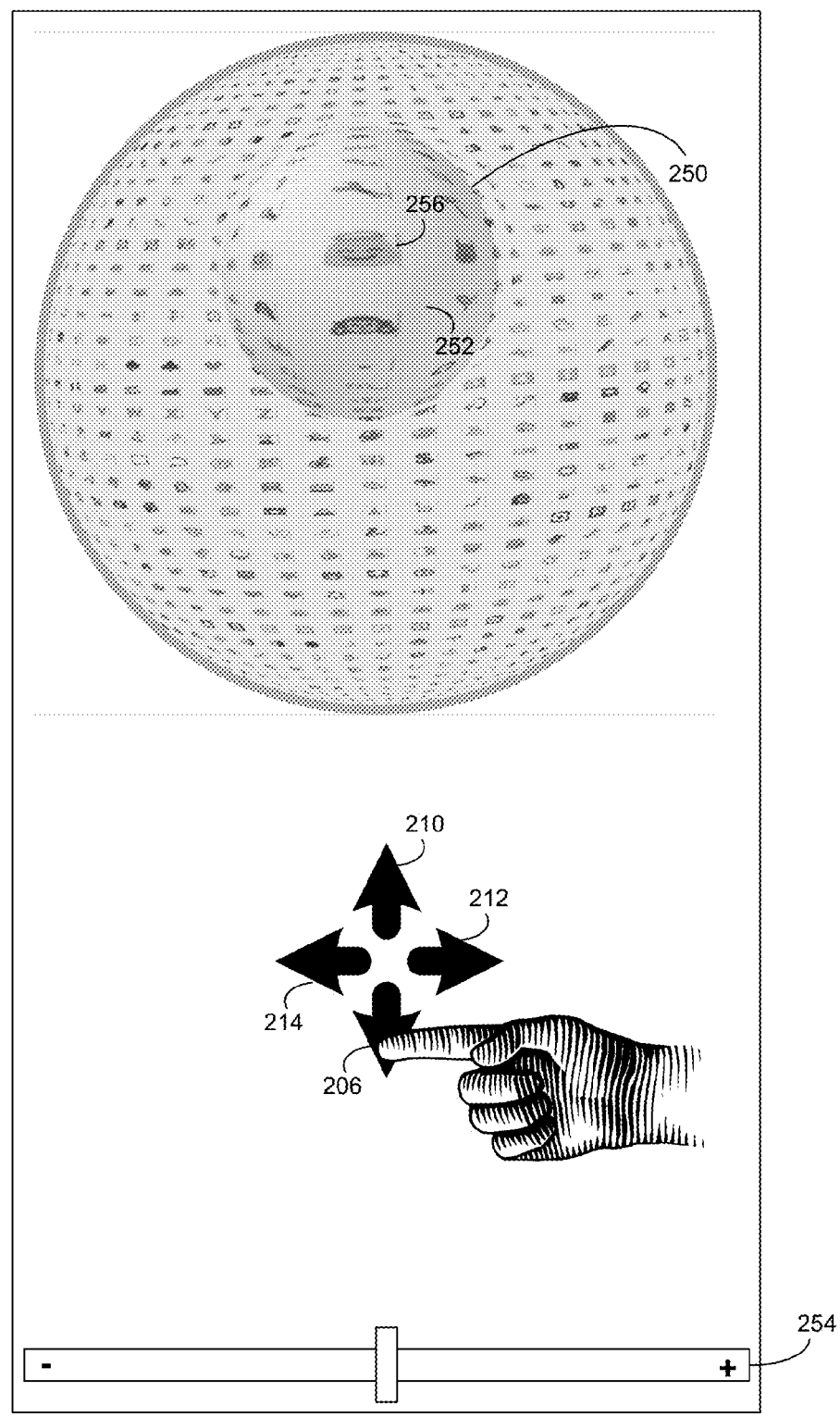
FIG. 5 is a diagrammatic view of another interface rendered by the item selection process of FIG. 1 according to an implementation of the present disclosure.

Referring also to FIG. 5, item selection process 10 may receive 102 a portion selection input (e.g. portion selection input 54) from user 36 identifying a portion (e.g. area 216) of initial viewing field 200, thus defining a selected portion of initial viewing field 200. An example of portion selection input 54 is a "double tap", wherein user 36 quickly double taps on area 216. In response to portion selection input 54, item selection process 10 may render 104 spherical magnified viewing field 250 of the selected portion (e.g., area 216) of initial viewing field 200. Spherical magnified viewing field 250 may include one or more magnified thumbnail images (e.g., magnified thumbnail images 252) that are magnified views of one or more of the plurality of thumbnail images (e.g., thumbnail images 202) included within initial viewing field 200. Due to the enhanced size of magnified thumbnail images 252, the ability of user 36 to review magnified thumbnail images 252 to determine whether any of these magnified thumbnail images is associated with the specific photographic image included within the various data files 150 included within folder 152 may not be compromised.

Additionally, item selection process 10 may be configured to enable 106 user 36 to vary a magnification level associated with spherical magnified viewing field 250. For example, if user 36 thinks that spherical magnified viewing field 250 is not magnified enough, user 36 may increase the level of magnification by e.g. using a plurality of fingers on display screen 154 to "pinch" spherical magnified viewing field 250 (by drawing their fingers together) and increase the level of magnification associated with spherical magnified viewing field 250. Further, if user 36 thinks that spherical magnified viewing field 250 is magnified too much, user 36 may decrease the level of magnification by e.g. using a plurality of fingers on display screen 154 to "spread out" spherical magnified viewing field 250 (by spreading their fingers apart) and decrease the level of magnification associated with spherical magnified viewing field 250. Alternatively, item selection process 10 may be configured to render magnification control slider 254 so that e.g. when moved to the right, item selection process 10 increases the magnification level of spherical magnified viewing field 250; and when moved to the left, item selection process 10 decreases the magnification level of spherical magnified viewing field 250.

In the event that display screen 154 is not touch-sensitive, user 36 may increase or decrease the magnification level associated with spherical magnified viewing field 250 via an input device (e.g. a mouse, a touchpad, a keyboard-based joystick, keyboard keys, or dedicated switches; not shown).

Once user 36 identifies the magnified thumbnail image (e.g., magnified thumbnail image 256) that is associated with the specific photographic image that they are looking for, user 36 may select magnified thumbnail image 256 (e.g., by double tapping on the same), resulting in the generation of a thumbnail selection input (e.g., thumbnail selection input 56).

Item selection process 10 may receive 108 thumbnail selection input 56 from user 36 identifying a selected magnified thumbnail image (e.g., magnified thumbnail image 256) chosen from the magnified thumbnail images 252 included within spherical magnified viewing field 250. In response to thumbnail selection input 56, item selection process 10 may process 110 magnified thumbnail image 256 and (in this example) open the specific data file that is associated with the selected magnified thumbnail image (e.g., magnified thumbnail image 256). For example, if magnified thumbnail image 256 is associated with data file 156, upon item selection process 10 receiving 108 thumbnail selection input 56 from user 36 (identifying magnified thumbnail image 256), item selection process 10 may process 110 magnified thumbnail image 256 by opening data file 156.

As discussed above, while the above discussion concerned each of the plurality of thumbnail images (e.g., thumbnail images 202) being associated with specific data file (e.g., data file 156), this is for illustrative purposes only and is not intended to be a limitation of this disclosure, as other configurations are possible and are considered to be within the scope of this disclosure. As discussed, each of the plurality of thumbnail images (e.g., thumbnail images 202) may be associated with any computer object, examples of which may include but are not limited to: a data file, an application icon, a data folder, a shortcut, or a batch routine.

Accordingly, if magnified thumbnail image 256 is associated with an application (e.g., an email application), upon item selection process 10 receiving 108 thumbnail selection input 56 from user 36 (identifying magnified thumbnail image 256), item selection process 10 may process 110 magnified thumbnail image 256 by launching e.g., the email application. Alternatively, if magnified thumbnail image 256 is associated with a folder/directory (e.g., a data folder named "Vacation 2013"), upon item selection process 10 receiving 108 thumbnail selection input 56 from user 36 (identifying magnified thumbnail image 256), item selection process 10 may process 110 magnified thumbnail image 256 by opening the "Vacation 2013" data folder.

Continuing with the above-stated example, in the event that the desired magnified thumbnail image is not located within spherical magnified viewing field 250, user 36 may navigate into other areas of the surface of sphere 204. As discussed above, if display screen 154 is a touch-sensitive display screen, user 36 may manipulate what is displayed on display screen 154 via one or more touch-based commands that are provided to item selection process 10. Conversely, if display screen 154 is not a touch-sensitive display screen, user 36 may need to provide input to item selection process 10 using an input device (e.g. a mouse, a touchpad, a keyboard-based joystick, keyboard keys, or dedicated switches; not shown).

Assume that user 36 wishes to navigate into another area of the surface of sphere 204 to look for a particular magnified thumbnail image, as the magnified thumbnail images 252 included within spherical magnified viewing field 250 are not associated with the data file that user 36 is looking for. Accordingly, user 36 may e.g., swipe a finger in a downward, upward, rightward or leftward direction (as discussed above), resulting in the generation of a scrolling input (e.g. scrolling input 58). Item selection process 10 may receive 112 scrolling input 58 from user 36 (wherein scrolling input 58 identifies the direction in which user 36 would like to scroll).

The manner in which item selection process 10 reacts to scrolling input 58 may vary depending upon where the scrolling input occurred within display screen 154. For example, scrolling input 58 may be generated by user 36 swiping their finger within spherical magnified viewing field 250 or by swiping their finger within initial viewing field 200.

If scrolling input 58 concerns a requested movement (in the scroll direction) of the magnified thumbnail images (e.g., magnified thumbnail images 252) included within spherical magnified viewing field 250, item selection process 10 may modify 114 spherical magnified viewing field 250 in response to scrolling input 58 and may update 116 initial viewing field 200 in response to the modification of spherical magnified viewing field 250.

Conversely, if scrolling input 58 concerns a requested movement (in the scroll direction) of the thumbnail images (e.g., thumbnail images 202) included within initial viewing field 200, item selection process 10 may modify 118 initial viewing field 200 in response to scrolling input 58 and may update 120 spherical magnified viewing field 250 in response to the modification of initial viewing field 200.

For example, assume that the current level of magnification of spherical magnified viewing field 250 is four times greater than the level of magnification of initial viewing field 200. Accordingly, if user 36 swipes a finger within spherical magnified viewing field 250, the magnified thumbnail images (e.g., magnified thumbnail images 252) included within spherical magnified viewing field 250 may be displaced in the amount and direction of scrolling input 58, while the thumbnail images (e.g., thumbnail images 202) included within initial viewing field 200 may be displaced one-quarter of the amount and direction of scrolling input 58 (due to the 4× magnification level of spherical magnified viewing field 250). Conversely, if user 36 swipes their finger within initial viewing field 200, the thumbnail images (e.g., thumbnail images 202) included within initial viewing field 200 may be displaced in the amount and direction of scrolling input 58, while the magnified thumbnail images (e.g., magnified thumbnail images 252) included within spherical magnified viewing field 250 may be displaced four times the amount and direction of scrolling input 58 (due to the 4× magnification level of spherical magnified viewing field 250).

The above discussion concerning the linear relationship between displacement within initial viewing field 200 and spherical magnified viewing field 250 is for illustrative purposes only and is not intended to be a limitation of this disclosure, as other configurations are possible and are considered to be within the scope of the disclosure. For example, displacements made within initial viewing field 200 and/or spherical magnified viewing field 250 may be related to each other in a manner that does not directly utilize the above-described magnification level.

Figure 6:
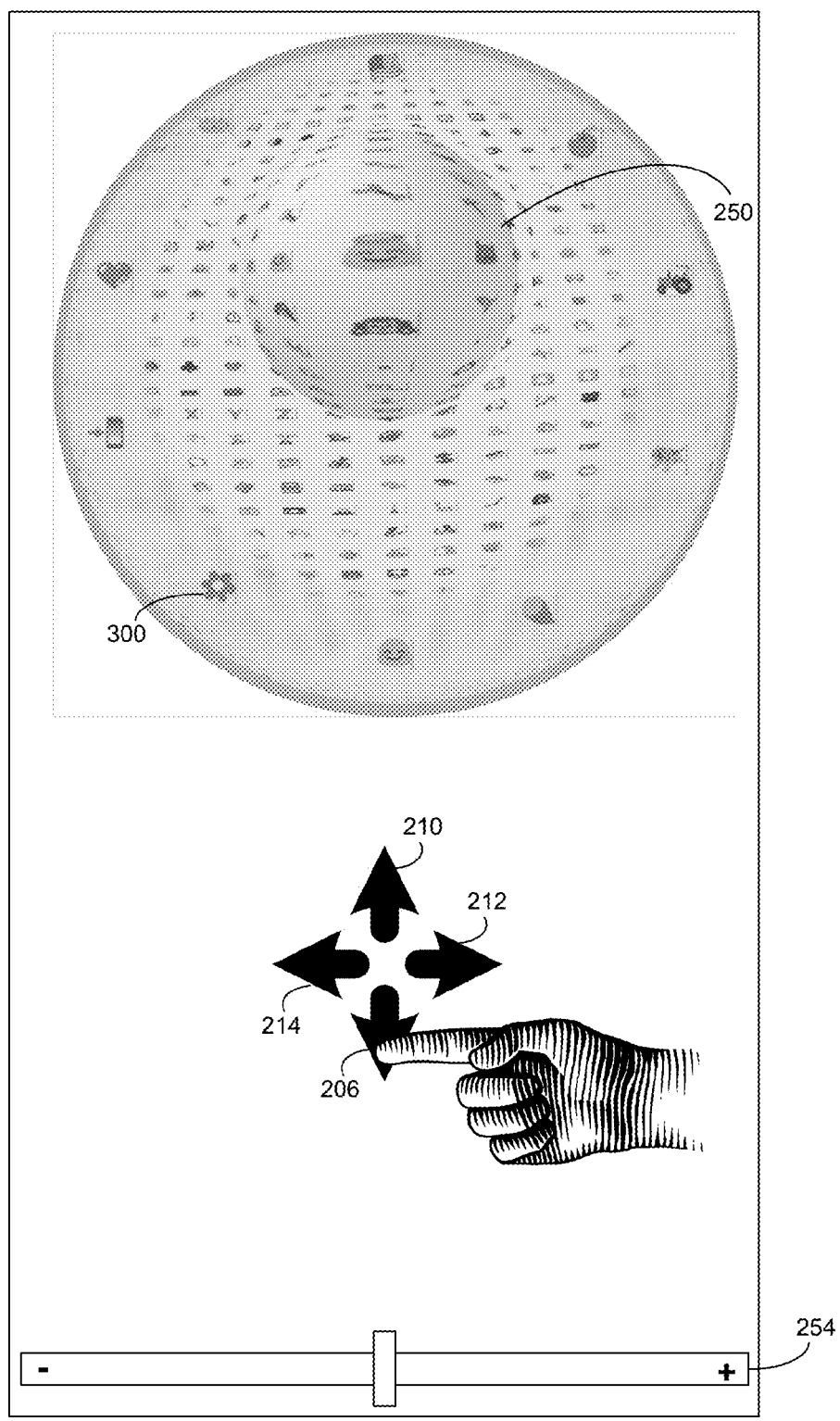
FIG. 6 is a diagrammatic view of another interface rendered by the item selection process of FIG. 1 according to an implementation of the present disclosure.

Referring also to FIG. 6, item selection process 10 may be configured to coalesce groups of the plurality of thumbnail images (e.g., thumbnail images 202) included within initial viewing field 200 into one image that is intended to define the group. As shown in FIG. 3, thumbnail images positioned about the periphery of sphere 204 may be quite small in size and, therefore, difficult for user 36 to identify. Accordingly, item selection process 10 may be configured to process the thumbnail images positioned about the periphery of sphere 204 so that coalesced thumbnail images (e.g., coalesced thumbnail image 300) may be rendered about the periphery of sphere 204 to aid e.g., user 36 in reviewing these thumbnail images. For example, item selection process 10 may process a group of thumbnail images positioned about the periphery of sphere 204 to determine if they have any common features. Examples of how item selection process 10 may compare these thumbnail images may include but are not limited to: image similarity detection algorithms that detect images that have common graphical features (e.g., beaches, clouds, forests, mountains, buildings, similar coloring, or similar lighting); face detection algorithms that detect images that include the same faces/people; tag detection algorithms that identify images that share common tags; metadata detection algorithms that identify images that share common metadata; and position detection algorithms that identify images that share proximate GPS coordinates.

Once this comparison has been performed, item selection process 10 may generate a coalesced thumbnail image (e.g., coalesced thumbnail image 300) that represents the group of thumbnail images. For example, if item selection process 10 compared a group of ten thumbnail images positioned about the periphery of sphere 204 and determined that each of these ten images includes a flower; item selection process 10 may generate a coalesced thumbnail image (e.g., coalesced thumbnail image 300) that includes a flower. Accordingly, if user 36 is looking for a photograph of a flower, user 36 may select coalesced thumbnail image 300, resulting in item selection process 10 positioning the thumbnail images associated with coalesced thumbnail image 300 within spherical magnified viewing field 250.

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
rendering an initial viewing field including a plurality of thumbnail images positioned about a spherical surface, wherein each of the plurality of thumbnail images is associated with a computer object and the initial viewing field is mapped onto the spherical surface;
receiving a portion selection input from a user identifying a portion of the initial viewing field, defining a selected portion of the initial viewing field positioned about the spherical surface;
in response to the portion selection input, distorting the spherical surface in a localized manner to render a spherical magnified viewing field of the selected portion of the initial viewing field, wherein the spherical magnified viewing field includes one or more magnified thumbnail images that are magnified views of one or more of the plurality of thumbnail images included within the initial viewing field;
receiving an input from the user, the input indicating a first amount of scroll and a scroll direction of the spherical surface;
determining a current level of magnification of the spherical magnified viewing field; and
updating the initial viewing field by:
displacing the spherical surface in the first amount of scroll along the scroll direction of the spherical surface; and
displacing the spherical magnified viewing field in a second amount of scroll along the scroll direction of the spherical surface, the second amount of scroll being based on the first amount of scroll and the current level of magnification of the spherical magnified viewing field.

2. The computer-implemented method of claim 1 wherein the initial viewing field is a spherical viewing field.

3. The computer-implemented method of claim 1 further comprising:
enabling the user to vary a magnification level associated with the spherical magnified viewing field.

4. The computer-implemented method of claim 1 further comprising:
receiving a thumbnail selection input from the user identifying a selected magnified thumbnail image chosen from the one or more magnified thumbnail images included within the spherical magnified viewing field; and
in response to the thumbnail selection input, processing a specific computer object associated with the selected magnified thumbnail image.

5. The computer-implemented method of claim 1 further comprising:
receiving a scrolling input from the user, wherein the scrolling input identifies a scroll direction.

6. The computer-implemented method of claim 5 wherein the scrolling input concerns a requested movement in the scroll direction of the one or more magnified thumbnail images included within the spherical magnified viewing field, the computer-implemented method further comprising:
modifying the spherical magnified viewing field in response to the scrolling input; and
updating the initial viewing field in response to the modification of the spherical magnified viewing field.

7. The computer-implemented method of claim 5 wherein the scrolling input concerns a requested movement in the scroll direction of the one or more thumbnail images included within the initial viewing field, the computer-implemented method further comprising:
modifying the initial viewing field in response to the scrolling input; and
updating the spherical magnified viewing field in response to the modification of the initial viewing field.

8. A computer program product residing on a non-transitory computer readable medium having a plurality of instructions stored thereon which, when executed by a processor, cause the processor to perform operations comprising:
rendering an initial viewing field including a plurality of thumbnail images positioned about a spherical surface, wherein each of the plurality of thumbnail images is associated with a computer object and the initial viewing field is mapped onto the spherical surface;
receiving a portion selection input from a user identifying a portion of the initial viewing field, defining a selected portion of the initial viewing field positioned about the spherical surface;
in response to the portion selection input, distorting the spherical surface in a localized manner to render a spherical magnified viewing field of the selected portion of the initial viewing field, wherein the spherical magnified viewing field includes one or more magnified thumbnail images that are magnified views of one or more of the plurality of thumbnail images included within the initial viewing field;
receiving an input from the user, the input indicating a first amount of scroll and a scroll direction of the spherical surface;
determining a current level of magnification of the spherical magnified viewing field; and
updating the initial viewing field by:
displacing the spherical surface in the first amount of scroll along the scroll direction of the spherical surface; and
displacing the spherical magnified viewing field in a second amount of scroll along the scroll direction of the spherical surface, the second amount of scroll being based on the first amount of scroll and the current level of magnification of the spherical magnified viewing field.

9. The computer program product of claim 8 wherein the initial viewing field is a spherical viewing field.

10. The computer program product of claim 8 further configured to perform operations comprising:

enabling the user to vary a magnification level associated with the spherical magnified viewing field.

11. The computer program product of claim 8 further configured to perform operations comprising:
receiving a thumbnail selection input from the user identifying a selected magnified thumbnail image chosen from the one or more magnified thumbnail images included within the spherical magnified viewing field; and
in response to the thumbnail selection input, processing a specific computer object associated with the selected magnified thumbnail image.

12. The computer program product of claim 8 further configured to perform operations comprising:
receiving a scrolling input from the user, wherein the scrolling input identifies a scroll direction.

13. The computer program product of claim 12 wherein the scrolling input concerns a requested movement in the scroll direction of the one or more magnified thumbnail images included within the spherical magnified viewing field, the computer-implemented method further configured to perform operations comprising:
modifying the spherical magnified viewing field in response to the scrolling input; and
updating the initial viewing field in response to the modification of the spherical magnified viewing field.

14. The computer program product of claim 12 wherein the scrolling input concerns a requested movement in the scroll direction of the one or more thumbnail images included within the initial viewing field, the computer-implemented method further configured to perform operations comprising:
modifying the initial viewing field in response to the scrolling input; and
updating the spherical magnified viewing field in response to the modification of the initial viewing field.

15. A computing system including a processor and memory configured to perform operations comprising:
rendering an initial viewing field including a plurality of thumbnail images positioned about a spherical surface, wherein each of the plurality of thumbnail images is associated with a computer object and the initial viewing field is mapped onto the spherical surface;
receiving a portion selection input from a user identifying a portion of the initial viewing field, defining a selected portion of the initial viewing field positioned about the spherical surface;
in response to the portion selection input, distorting the spherical surface in a localized manner to render a spherical magnified viewing field of the selected portion of the initial viewing field, wherein the spherical magnified viewing field includes one or more magnified thumbnail images that are magnified views of one or more of the plurality of thumbnail images included within the initial viewing field;

receiving an input from the user, the input indicating a first amount of scroll and a scroll direction of the spherical surface;
determining a current level of magnification of the spherical magnified viewing field; and
updating the initial viewing field by:
displacing the spherical surface in the first amount of scroll along the scroll direction of the spherical surface; and
displacing the spherical magnified viewing field in a second amount of scroll along the scroll direction of the spherical surface, the second amount of scroll being based on the first amount of scroll and the current level of magnification of the spherical magnified viewing field.

16. The computing system of claim 15 wherein the initial viewing field is a spherical viewing field.

17. The computing system of claim 15 further configured to perform operations comprising:
enabling the user to vary a magnification level associated with the spherical magnified viewing field.

18. The computing system of claim 15 further configured to perform operations comprising:
receiving a thumbnail selection input from the user identifying a selected magnified thumbnail image chosen from the one or more magnified thumbnail images included within the spherical magnified viewing field; and
in response to the thumbnail selection input, processing a specific computer object associated with the selected magnified thumbnail image.

19. The computing system of claim 15 further configured to perform operations comprising:
receiving a scrolling input from the user, wherein the scrolling input identifies a scroll direction.

20. The computing system of claim 19 wherein the scrolling input concerns a requested movement in the scroll direction of the one or more magnified thumbnail images included within the spherical magnified viewing field, the computer-implemented method further configured to perform operations comprising:
modifying the spherical magnified viewing field in response to the scrolling input; and
updating the initial viewing field in response to the modification of the spherical magnified viewing field.

21. The computing system of claim 19 wherein the scrolling input concerns a requested movement in the scroll direction of the one or more thumbnail images included within the initial viewing field, the computer-implemented method further configured to perform operations comprising:
modifying the initial viewing field in response to the scrolling input; and
updating the spherical magnified viewing field in response to the modification of the initial viewing field.

* * * * *

UNITED STATES PATENT AND TRADEMARK OFFICE
CERTIFICATE OF CORRECTION

PATENT NO. : 9,529,509 B1
APPLICATION NO. : 14/039405
DATED : December 27, 2016
INVENTOR(S) : Brian K. Schmidt It is certified that error appears in the above-identified patent and that said Letters Patent is hereby corrected as shown below:

In the Specification

In Column 7, Line 28, please replace "of the" with --other--

Signed and Sealed this
Seventh Day of March, 2017

Michelle K. Lee
*Director of the United States Patent and Trademark Office*